United States Patent [19]
Yavnayi et al.

[11] Patent Number: 5,388,048
[45] Date of Patent: Feb. 7, 1995

[54] VEHICLE ANTI-COLLISON DEVICE

[75] Inventors: Amotz Yavnayi, Kiryat Motzkin; Moshe Gavish; Pinchas Schechner, both of Kiryat Bialik; Israel Kantor, Haifa, all of Israel

[73] Assignee: Silicon Heights Limited, Israel

[21] Appl. No.: 17,742

[22] Filed: Feb. 16, 1993

[51] Int. Cl.$^6$ .......................................... G06F 15/50
[52] U.S. Cl. .............................. 364/461; 364/426.04; 342/455; 340/903; 180/169; 180/170
[58] Field of Search ................. 364/426.04, 431.07, 364/460, 461; 180/167-170, 176-179; 123/350, 352; 340/903; 342/454, 455

[56] References Cited

U.S. PATENT DOCUMENTS

| | | | |
|---|---|---|---|
| 2,142,378 | 1/1939 | Sachtleben | 250/41.5 |
| 3,313,945 | 4/1967 | Clinton | 250/236 |
| 3,446,979 | 5/1969 | Ricciardi | 250/231 |
| 3,486,032 | 12/1969 | Cufflin | 250/211 |
| 3,519,351 | 7/1970 | Lerwill | 356/28 |
| 3,704,445 | 11/1972 | Lanham | 340/62 |
| 3,731,301 | 5/1973 | Davis | 340/347 P |
| 3,749,197 | 7/1973 | Deutsch | 180/98 |
| 3,856,403 | 12/1974 | Maughmer et al. | 356/28 |
| 3,949,359 | 4/1976 | Sorkin | 340/54 |
| 4,387,785 | 6/1983 | Fromm | 181/142 |
| 4,418,288 | 11/1983 | Imai et al. | 307/117 |
| 4,502,045 | 2/1985 | Fromm | 340/671 |
| 4,580,130 | 4/1986 | Tokunaga et al. | 340/347 |
| 4,673,809 | 6/1987 | Geyer et al. | 250/231 SE |
| 4,706,195 | 11/1987 | Yoshino et al. | 364/426 |
| 4,757,450 | 6/1988 | Etoh | 364/426 |
| 4,766,421 | 4/1988 | Beggs | 340/904 |
| 4,767,164 | 8/1988 | Yeung | 303/71 |
| 4,866,987 | 9/1989 | Willson et al. | 73/655 |
| 4,872,051 | 10/1989 | Dye | 358/103 |
| 4,948,246 | 8/1990 | Shigematsu | 356/5 |
| 4,987,299 | 1/1991 | Kobayashi et al. | 250/231.14 |
| 5,014,200 | 5/1991 | Chundrlik et al. | 364/426.04 |
| 5,059,901 | 10/1991 | Van Voorhis | 324/175 |
| 5,103,213 | 4/1992 | Marsh et al. | 340/671 |
| 5,153,559 | 10/1992 | Atsumi | 340/435 |
| 5,166,881 | 11/1992 | Akasu | 364/461 |
| 5,230,400 | 7/1993 | Kakinami et al. | 180/169 |
| 5,234,071 | 8/1993 | Kajiwara | 180/169 |
| 5,278,764 | 1/1994 | Iizuka et al. | 364/461 |

FOREIGN PATENT DOCUMENTS

| | | |
|---|---|---|
| 0473866 | 3/1992 | European Pat. Off. . |
| 59-024278 | 2/1984 | Japan . |
| 2139445 | 11/1984 | United Kingdom . |

*Primary Examiner*—Gary Chin
*Attorney, Agent, or Firm*—Leonard Bloom

[57] ABSTRACT

A vehicle anti-collision device comprising a laser rangefinder mounted inside a vehicle near to a windshield thereof. The distance of the vehicle from a leading vehicle is constantly calculated and sampled at predetermined time intervals, enabling the closing velocity of the vehicle with respect to the leading vehicle to be calculated. A digital speedometer is provided for determining the self-speed of the vehicle whereby the safety time between the two vehicles may be calculated. The safety time is displayed and an audible alarm is sounded in the event that the calculated safety time is less than a predetermined threshold. Preferably, the rangefinder is coupled to the vehicle's steering mechanism so as to be responsive to a turning radius of the vehicle in order that the rangefinder may distinguish between two vehicles travelling in the same lane and in different lanes, respectively. Likewise, provision is made for compensating for the elevation angle of the rangefinder beam for variations in load distribution within the vehicle.

13 Claims, 12 Drawing Sheets

VEHICLE ANTI-COLLISON DEVICE

FIELD OF THE INVENTION

This invention relates to a vehicle anti-collision device for aiding a driver in maintaining a safe distance between his vehicle and the one in front.

BACKGROUND OF THE INVENTION

Failure to keep the correct distance between two vehicles following one another is one of the principal factors leading to road accidents. Conforming the distance between adjacent vehicles to their speeds under variable conditions is subjective and depends on many factors. Thus, for example, lighting conditions, ambient weather, traffic density, road conditions, driver alertness and so on are all factors which can influence a driver's ability to keep a safe distance between two vehicles which, if not properly maintained, can result in a rear-end collision.

Existing anti-collision systems are either passive or active. Passive devices warn the driver of a rear, or following, vehicle when he is approaching too close to the vehicle in front (hereinafter the "leading" vehicle) for his current road speed. The warning having been provided, the initiative is now the driver's to take suitable precautionary action.

In contrast to this, active devices include a servo-control system typically coupled to the throttle valve so that, in the event that the driver does not maintain a safe distance from the leading vehicle for his current road speed, the following vehicle is automatically decelerated so as to reduce its road speed to a safe stopping speed based on the reduced distance between the two vehicles. U.S. Pat. No. 4,706,195 (Yoshino et al.) describes such an active speed control system.

The system disclosed by Yoshino et al. is based on a laser radar for measuring the distance of the following vehicle from the leading vehicle, the speed of the following vehicle being determined by a speed sensor coupled to the speedometer.

It is clear that passive systems also must comprise at least these two elements: namely some sort of rangefinder for determining the distance between two vehicles and also means for determining the speed of the following vehicle. However, in practice, it has been found that both passive and active systems have proven difficult to exploit commercially for several reasons. First, it is difficult to design a system which is easily amenable to coupling to all existing vehicles without requiring special customization for each vehicle. As soon as such customization is required, this raises the price of the system.

A further drawback relating to the development of such systems concerns the occurrence of false alarms. When a false alarm is obtained with active systems, the result is not merely irritating but can even be dangerous in that it is liable to lead to a rear-end collision between the following vehicle and the one behind it. This can occur because the following vehicle abruptly slows down (or stops) for no reason, leaving the vehicle behind him insufficient time to take precautionary action and thereby leading to a collision between the two vehicles.

In passive systems, false alarms will produce similar dangerous results if the driver panics as a result of the alarm, applying his brakes too abruptly and resulting possibly in skidding of his own vehicle or, for the same reasons as explained above, a rear-end collision between his vehicle and the one behind.

On a straight, level road with no camber and a uniformly distributed load in the following vehicle, it is relatively easy to design laser rangefinders which produce reliable and accurate results. However, in practice, such ideal conditions are rarely met. A non-uniform load distribution in the following vehicle can sufficiently alter the angle of inclination of the laser beam to produce erroneous results even on a level road surface. Thus, for example, people sitting on the rear seat or the addition of heavy luggage in the trunk of the vehicle can produce incorrect results in prior art systems. Likewise, as the following vehicle adjusts the steering angle in order to turn a curve, the direction of the laser beam, which remains coaxial with the longitudinal axis of the following vehicle, can miss a leading vehicle in the same lane or can strike a vehicle in an adjacent lane.

Yet a further consideration is how the speed of the following vehicle is determined. In vehicles having digital speedometers, it is straightforward to extract the digital readout thereof for use in a digital anti-collision system. However, many existing motor vehicles still employ analog speedometers, in which case it is necessary to extract the analog output thereof and convert it to an equivalent digital signal for use with a digital anti-collision system. As indicated above, this requires customization since not all analog speedometers are identical. Such customization increases the price of the system and may well render it commercially unacceptable.

Yet a further drawback associated with existing anti-collision devices is that the rangefinder is usually mounted outside of the vehicle typically near the fender, in accordance with the rationale that this is the initial point of contact with the leading vehicle in the event of a collision. However, mounting the rangefinder outside of the vehicle renders it susceptible to ambient weather conditions, to atmospheric pollution including the exhaust gases of the leading vehicle, and indeed to dirt which settles on the rangefinder's optics, thereby causing distortions and inaccuracies.

Yet a further consideration relates to the manner in which the device presents data to the driver. The alarm itself is, of course, typically audible. However, no less important than the alarm itself, is the calculated collision time between the two vehicles and whose rate of change is an important guide in preserving a safe stopping distance even before any alarm signal is sounded. If such data is presented to the driver via an instrument on the dashboard, this requires that the driver look down at the dashboard, thereby momentarily taking his eyes off the road. This is particularly hazardous in those situations where there exists a high probability of a collision. It is precisely in such situations that a driver must be completely aware of prevailing road conditions without, even momentarily, losing sight of the leading vehicle.

SUMMARY OF THE INVENTION

It is an object of the invention to provide a vehicle anti-collision device in which the drawbacks associated with hitherto proposed devices are substantially reduced or eliminated.

According to a broad aspect of the invention there is provided a vehicle anti-collision device comprising:

a rangefinder for mounting inside a following vehicle near to a windshield thereof for measuring a distance of said vehicle from a leading vehicle, distance sampling means coupled to the rangefinder for sampling measured distances at predetermined time intervals, self speed determination means for measuring a self speed of the following vehicle, collision time determination means coupled to the coupling means and to the self speed determination means and responsive to the measured self speed of the following vehicle for determining a collision time between the following and leading vehicles;

comparing means coupled to the collision time determination means for comparing said collision time with a predetermined threshold, and alarm means coupled to the comparing means for generating an alarm if the collision time is less than said predetermined threshold.

Preferably, the rangefinder includes a laser light source for emitting a narrow angle beam of laser light. One component of the laser beam passes through the windshield so as to be reflected by a leading vehicle, whilst a second component of the laser beam is reflected directly by the windshield back towards the device. The device is responsive to a difference in time between receipt of both components for determining the distance between the following and leading vehicles.

In a preferred embodiment according to the invention, the self-speed of the following vehicle is determined by counting pulses of light reflected by a light-reflecting strip adhered to an axle of the following vehicle: such an approach being universally applicable and obviating the need for customization to different vehicles.

BRIEF DESCRIPTION OF THE DRAWINGS

In order to understand the invention and to see how the same may be carried out in practice, a preferred example will now be described, by way of non-limiting example only, and with reference to the accompanying drawings, in which.

DETAILED DESCRIPTION OF A PREFERRED EMBODIMENT

Figure 1:
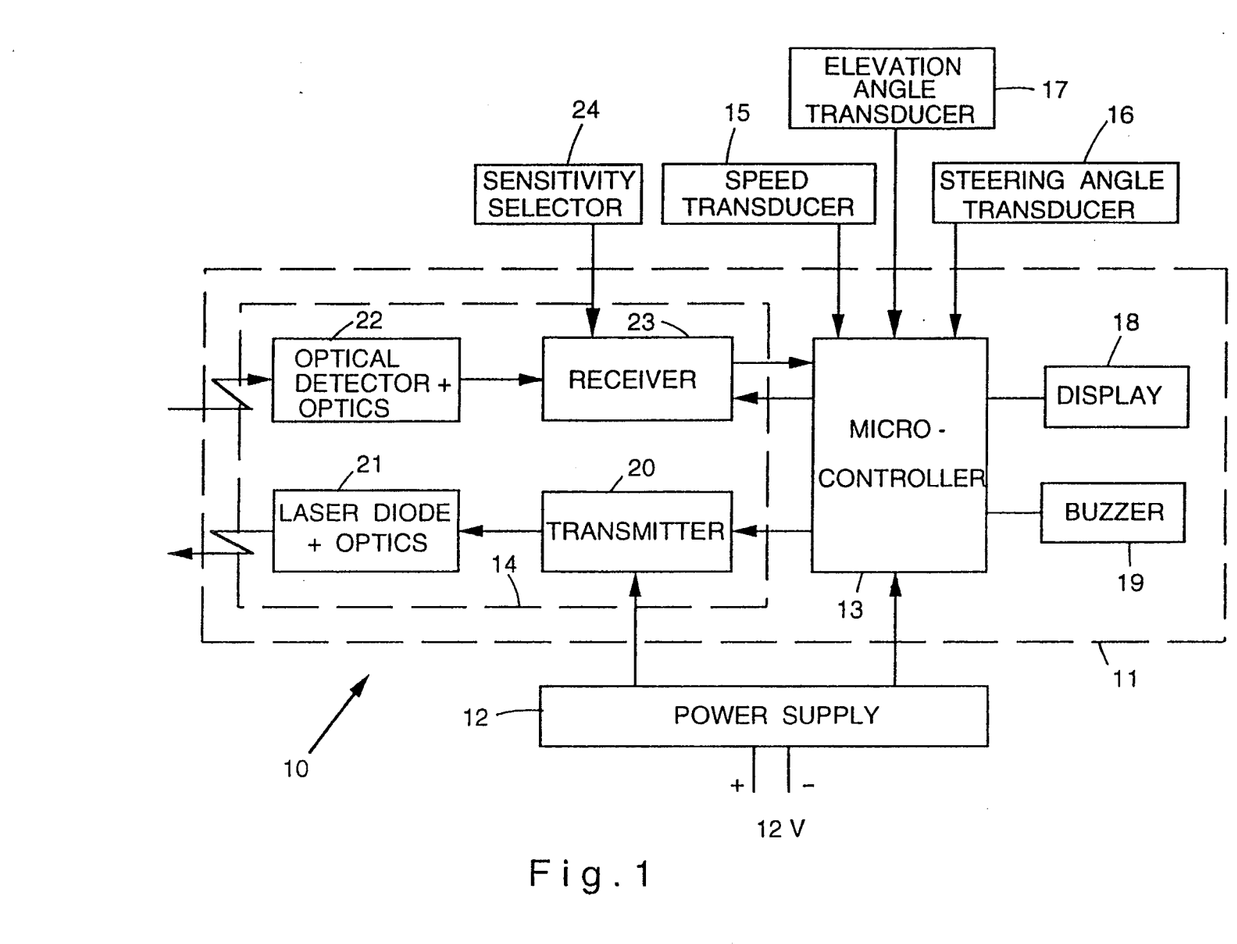
FIG. 1 is a block diagram showing functionally the principal components of a device according to the invention.

Referring to FIG. 1 there is shown a block diagram of a device depicted generally as 10 comprising an instrument 11 powered by a 12 V power supply 12. The power supply 12 is built as a separate system, assembled underneath a dashboard of a vehicle, and supplies the different voltages, as required, to the instrument 11 for the operation of the different electronic systems therein.

The instrument 11 comprises a micro-controller 13 coupled to a laser rangefinder 14, to a speed transducer 15, to a steering angle transducer 16 and to an elevation angle transducer 17. The microcontroller 13 is also coupled to a display 18 and to a buzzer 19. The display 18 and the buzzer 19 are contained within the instrument 11, whilst the speed transducer 15 and the steering angle transducer 16 are provided as separate units which are externally coupled to the microcontroller 13.

The laser rangefinder 14 comprises a transmitter 20 coupled to a laser diode and suitable optics 21. The laser diode and optics 21 emits a narrow angle laser beam which is intercepted by a leading vehicle so as to be reflected thereby and detected by an optical detector 22 an output of which is fed to a receiver 23 coupled to the micro-controller 13. A sensitivity selector 24 connected to the receiver 23 permits the sensitivity of the receiver 23 to be adjusted so as to allow for varying weather conditions, such as fog, for example.

Figure 2A:
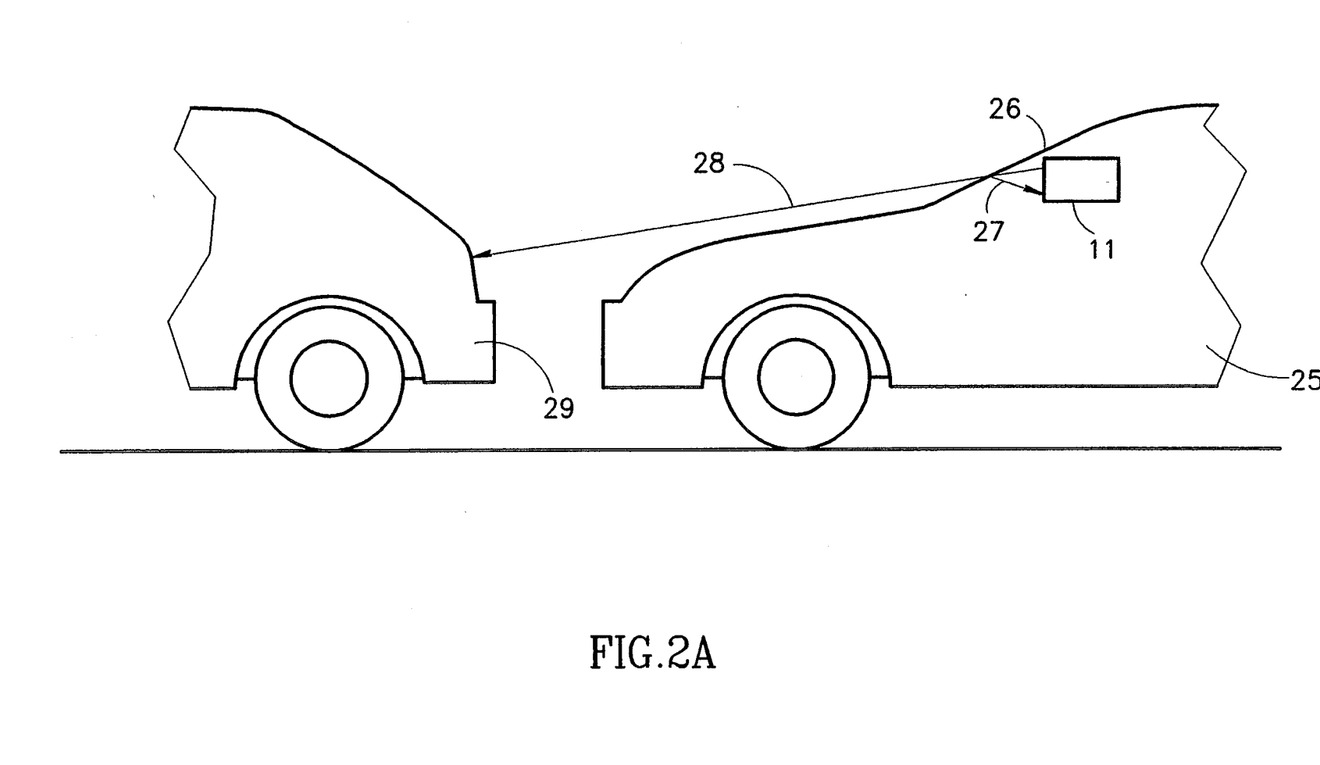
FIGS. 2a and 2b show pictorially a device according to the invention mounted inside a vehicle.
Figure 2B:
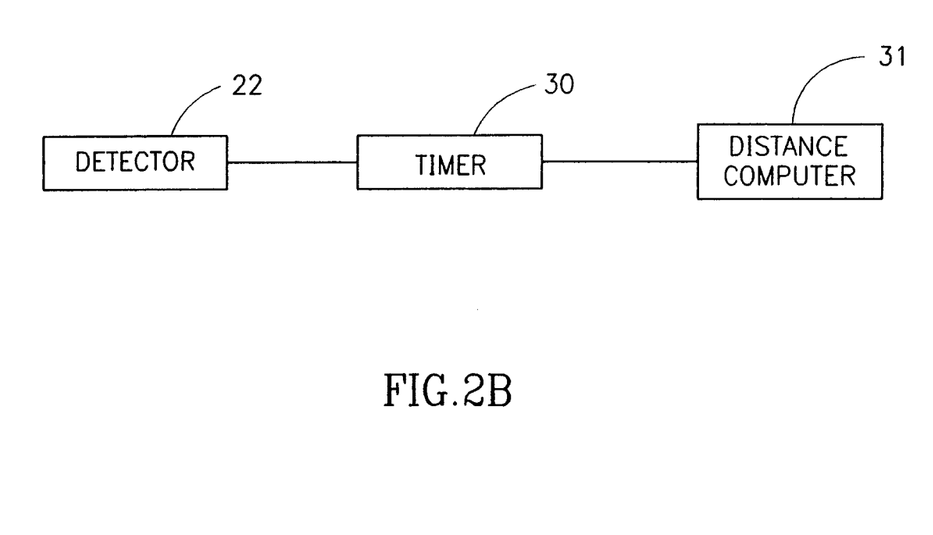

FIGS. 2a and 2b show pictorially the instrument 11 positioned within a vehicle 25 proximate a windshield 26 thereof and preferably glued thereto. The laser diode 21 (FIG. 1) emits a beam of laser light having a first component 27 which is reflected by the windshield 26 and a second component 28 which passes through the windshield 26 so as to be reflected by a leading vehicle 29 in front of the vehicle 25.

When the first and second components 27 and 28 of the laser beam strike the optical detector 22, corresponding first and second detector signals are generated thereby and fed to a timer 30 which measures an elapsed time Δt between receipt of the first and second components 27 and 28 of the laser beam. A distance computer 31 coupled to the timer 30 is responsive to the elapsed time Δt for determining the distance between the two vehicles.

Such an arrangement obviates the need for synchronization between the transmission of a laser pulse and subsequent receipt thereof, since both the first and second components 27 and 28 of the laser beam are derived from the same beam and any flight time delay between the actual emission of the laser beam and receipt of the first component 27 thereof by the detector 22 is exactly compensated for by the transit time for the second component 28 of the laser beam to reach the windshield 26 from the detector 22 during its outgoing trajectory and to reach the detector 22 from the windshield 26 on its return trajectory.

In practice, the timer 30 and the distance computer 31 are not provided by separate hardware circuits but, rather, are provided within the micro-controller 13.

A safety time threshold adjustment 33 is coupled to the distance computer 31 for adjusting the safety time threshold at which an alarm is given, in order to allow for different ambient conditions or wakefulness of the driver.

A frequency of the laser diode is randomly selected between predetermined lower and upper thresholds in respect of a specific instrument, the optical detector 22 being connected to a filter 32 for filtering out a received signal whose frequency differs from the selected frequency. By such means only a received signal of the correct frequency is accepted and a laser beam (of different frequency) directed towards the detector 22 by another vehicle also having a laser rangefinder fitted thereto will be filtered out, thereby reducing false alarms.

Figure 3:
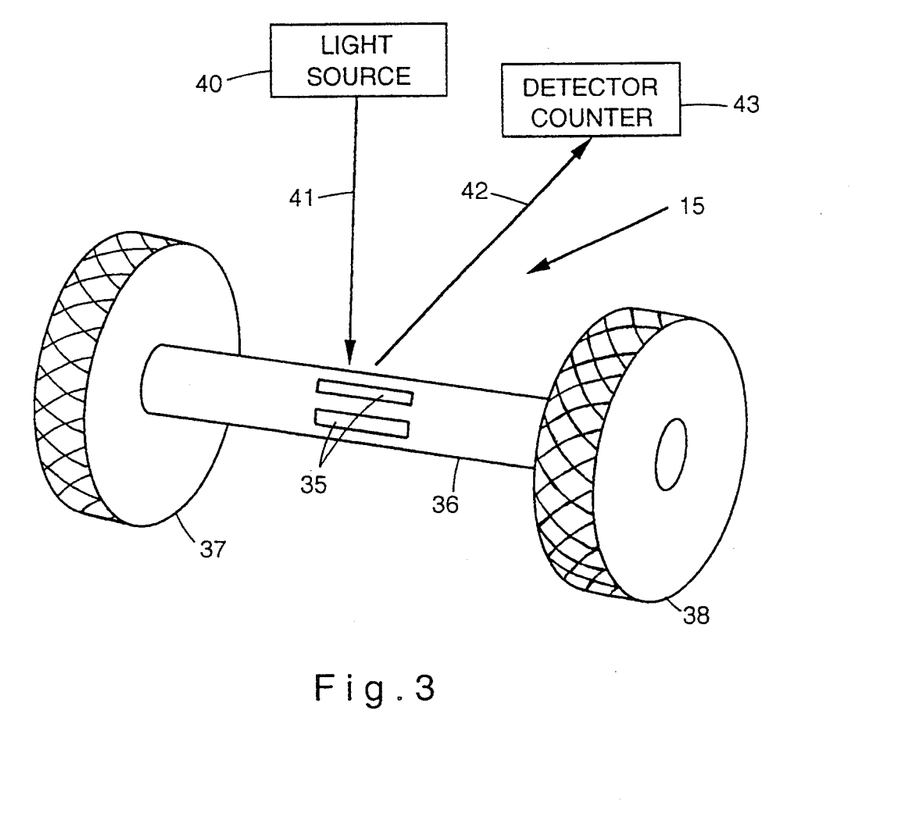
FIG. 3 shows pictorially a digital speedometer for use with the device.

FIG. 3 shows schematically the speed transducer 15 which comprises at least one light-reflecting strip 35 adhered to an appropriate drive shaft 36 of the vehicle. In a front wheel drive, the drive shaft 36 may be one of the two drive shafts on which the front wheels 37 and 38 are mounted. In a rear wheel drive, the drive shaft 36 is constituted by the common drive shaft between the gear box and the back axle (not shown). A light source 40 emits a continuous beam of light 41 towards the axle 36 in the region of the light-reflecting strip 35 so as to be reflected thereby as a reflected beam 42 which is intercepted by a detector/counter 43 which may be optically coupled to the light-reflecting strip via an optical fiber (not shown).

As the axle 36 rotates, a reflected beam 42 is emitted towards the detector/counter 43 each time the light-reflecting strip 35 intercepts the beam 41. The detector/counter 43 produces a pulse each time a reflected beam 42 is detected, each of the received pulses being counted. The number of pulses counted in a given time, in conjunction with the number of light-reflecting strips 35 provided on the axle 36, permits the number of revolutions per unit time of the axle 36 to be computed. This having been done, it is a simple matter to calculate the self-speed of the vehicle by multiplying the angular speed of the axle 36 by the radius of the wheels 37 and 38 mounted thereon.

In vehicles having digital speedometers provided as standard, the digital output thereof may be fed directly to the micro-controller 13 without the need for the components shown in FIG. 3 to be provided as separate elements. However, the arrangement shown in FIG. 3 is capable of universal application and does not require special customization for different vehicles, apart from specifying the wheel radius which is the only variable in such a system.

Figure 4:
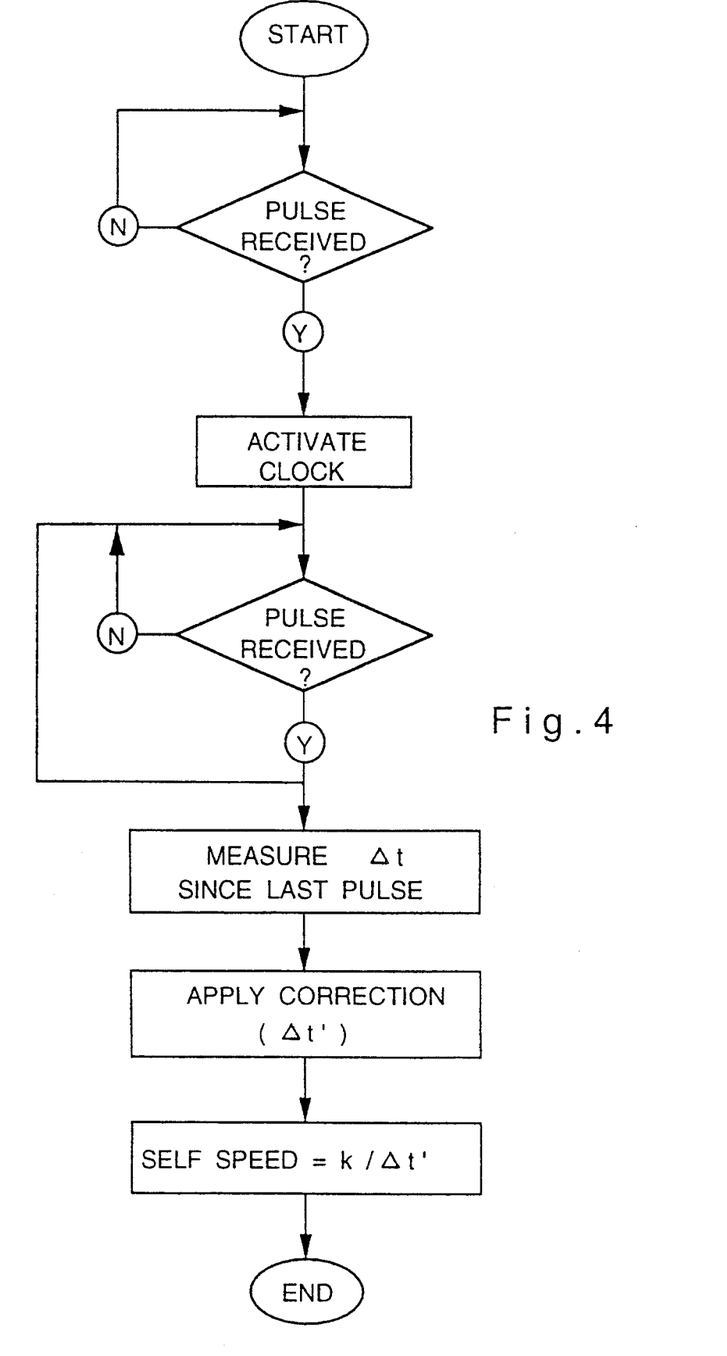
FIG. 4 is a flow diagram showing the principal steps associated with a method for determining the self-speed of a vehicle.

FIG. 4 is a flow diagram showing the principal steps associated with the calculation of self-speed using the arrangement described above with reference to FIG. 3 of the drawings.

Thus, the system is dormant until a first pulse is received, whereupon a clock is activated, such that on receipt of subsequent pulses, the elapsed time $\Delta t$ between successive pulses is measured. A correction factor is applied, as required, whereupon the self-speed of the vehicle is calculated in accordance with the equation:

$$V = \frac{k}{\Delta t'}$$

where:
  k is a constant which takes into account the number of light-reflecting strips 35 and the wheel radius, and
  $\Delta t'$ is the corrected elapsed time between pulses.

Figure 5A:
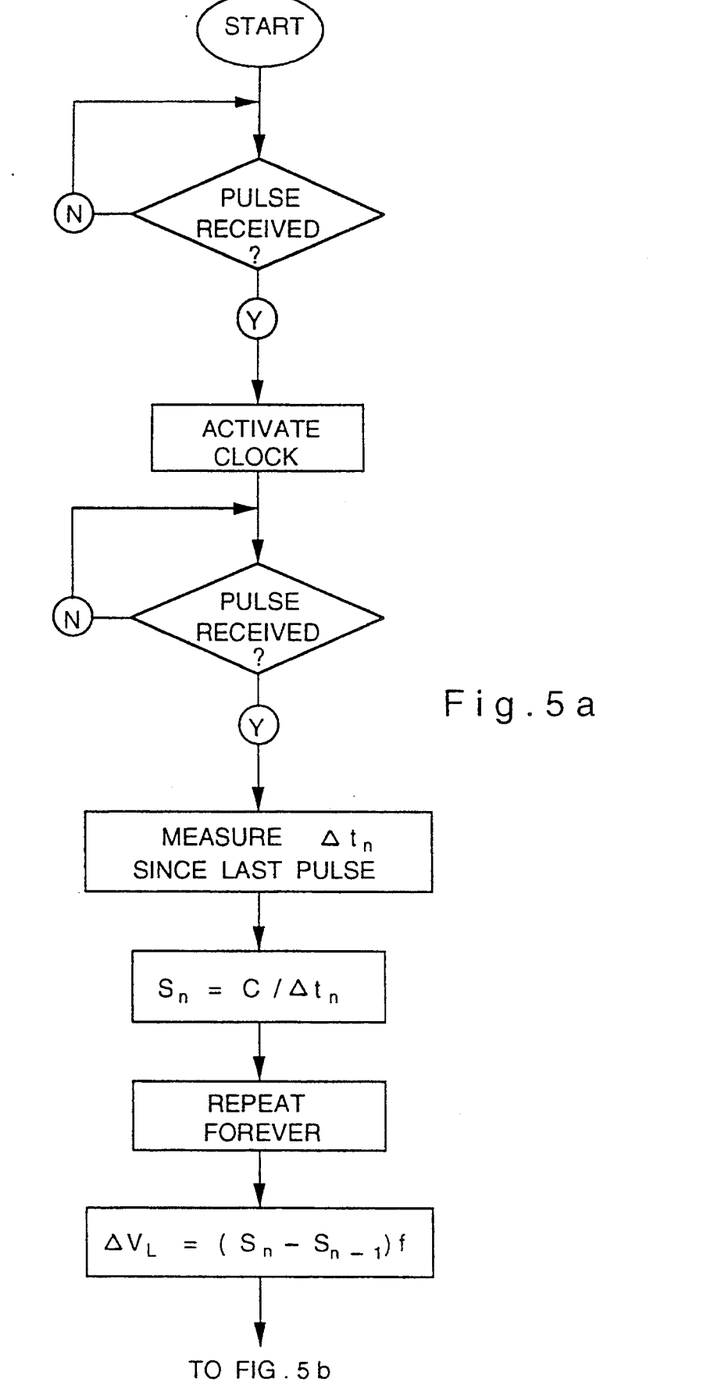
FIGS. 5a and 5b are flow diagrams showing the principal steps associated with a method for determining the speed of a leading vehicle as well as the collision time between two vehicles.
Figure 5B:
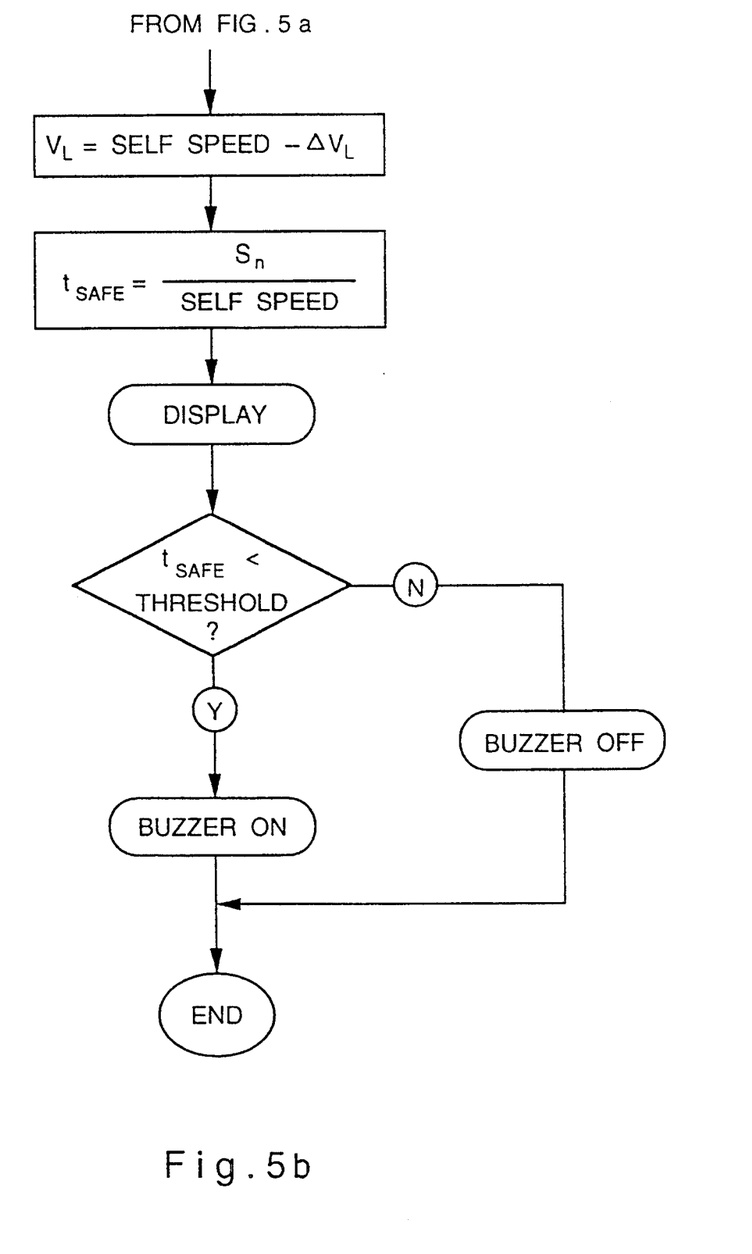

FIGS. 5a and 5b show the principal steps associated with the calculation of the speed $V_1$ of the leading vehicle and the collision time $t_{col}$ between the two vehicles. When the first component of the laser beam strikes the optical detector 22, a pulse is produced which activates a clock associated with the micro-controller 13. A second pulse is produced when the second component of the laser beam strikes the detector 22, thereby enabling the clock to measure the elapsed time $\Delta t$ between the two successive pulses. Since the speed c of the laser beam is known, the distance travelled thereby during an elapsed time $\Delta t$ may easily be calculated. In practice, this procedure is repeated continually and the results during a given time are averaged in order to reduce inaccuracies.

Denoting:
  $S_n$ as the calculated inter-vehicle distance during the nth iteration, and
  $f$ as the pulse frequency of the laser diode,
it may be shown that:

$$\Delta V_1 = (S_n - S_{n-1}) \times f$$

In the above equation $\Delta V_1$ represents the closing velocity with which the following vehicle approaches the leading vehicle. Since the self-speed of the following vehicle is known, it is therefore a simple matter to calculate the actual road speed of the leading vehicle.

Additionally, since the distance between the two vehicles has been determined, the collision time between the two vehicles may also be calculated. In this connection it should be noted that, strictly speaking, the collision time is equal to the distance divided by the closing velocity, $\Delta V_1$. However, in practice, most traffic laws impose a stricter criterion for the calculation of "safety time" between two vehicles, requiring that, the distance between the two vehicles be sufficient to enable the driver of the following vehicle to react properly even in the event that the leading vehicle stops instantaneously. In this case, of course, the closing speed is equal to the self-speed of the following vehicle.

The safety time having thus been calculated, it is displayed and also compared with a threshold, a buzzer being sounded in the event that the calculated safety time is less than the threshold.

Figure 6:
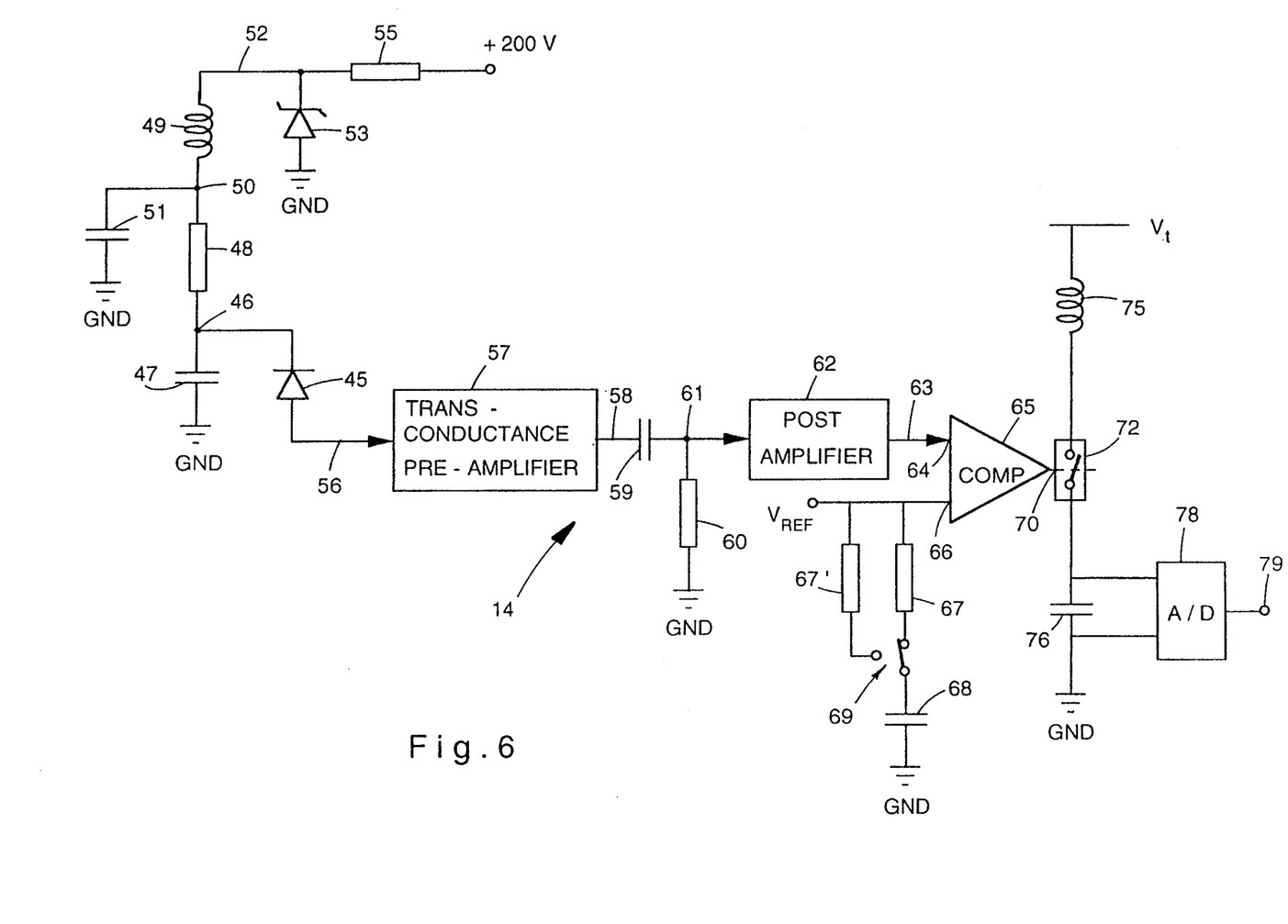
FIG. 6 is a schematic diagram showing the main components in a receiver of the rangefinder shown in FIG. 1.

FIG. 6 shows the principal circuit components in the rangefinder 14 shown functionally in FIG. 1 of the drawings. A silicon PIN diode detector 45 is connected to the junction 46 of a capacitor 47 connected in series with a resistor 48 and an inductance 49, a common terminal of which 50 is connected to ground GND via a capacitor 51. A voltage of 75 V is fed to a free terminal of the inductance 49 via a positive supply rail 52 connected to the positive terminal of a zener diode 53 whose negative terminal is connected to GND. The positive supply rail 52 is connected via a pull-down resistance 55 to a positive voltage supply of 200 V.

An output 56 of the laser diode 45 is connected to an input of a trans-conductance pre-amplifier shown functionally as 57, an output 58 of which is coupled via a capacitor 59 and a resistor 60 to an input 61 of a post-amplifier shown functionally as 62. The resistor 60 is connected across the input 61 and GND.

An output 63 of the post-amplifier is connected to a first input 64 of a fast comparator 65 a second input 66 of which is connected to a voltage reference $V_{ref}$ connected across a first resistor 67 in series with a capacitor 68, a low voltage terminal of which is connected to GND. A switch 69 in series with the capacitor 68 and the first resistor 67 permits connection of a second resistor 67' to the voltage reference $V_{ref}$ instead of the first resistor 67. Coupled to an output 70 of the comparator 65 is a switch shown functionally as 72 having an output thereof connected between a positive supply rail $V_t$ via a coil 75 and GND via a capacitor 76. An analog-to-digital (A/D) converter 78 having an output 79 is connected across the capacitor 76.

The operation of the circuit is as follows. An incoming laser pulse is detected by the PIN diode detector 45, an output of which is amplified by the trans-conductance pre-amplifier 57 in tandem with the post-amplifier 62. The output of the post-amplifier 63 is compared with $V_{ref}$ so that the fast comparator 65 produces an output only if the voltage appearing across its first input 64 exceeds the value of $V_{ref}$. The capacitor 68 which is fully charged sets a high threshold level for the incoming pulses, so that only very strong reflections from nearby targets are detected, thereby avoiding a major cause of false alarms.

As time passes, the capacitor 68 discharges through the first resistor 67 and the threshold level $V_{ref}$ is lowered accordingly. At the same time, the capacitor 70 is charged through the coil 75 at a constant current. When a threshold crossing is detected by the threshold detector 72, charging of the capacitor 76 stops and a voltage measurement by the A/D converter 78 is performed. The voltage appearing across the output 79 of the A/D converter 78 is proportional to the elapsed time Δt between receipt of successive pulses by the PIN diode detector 45 and therefore to the distance between adjacent vehicles.

The comparator 65 together with the switch 72 constitute a threshold detector for adjusting the sensitivity of the rangefinder in accordance with the time constant of the capacitor 68 in series with the selected resistor 67 or 67'. Thus, by selecting suitable values for the first and second resistors 67 and 67', respectively, the sensitivity of the rangefinder receiver may be increased or decreased. This is particularly useful for increasing the sensitivity of the device in adverse weather conditions, such as fog, when visibility is low so that detection of weak reflections over small distances may be effected.

The coil 75 together with the capacitor 76 and the A/D Converter 78 form an accurate time counter for measuring the range, this being proportional to elapsed time between receipt of successive pulses. In the particular configuration shown schematically in FIG. 2a of the drawings, successive pulses are, in fact, derived from first and second components of the beam being reflected by the windshield 26 of the following vehicle and by the leading vehicle, respectively. In this case, the elapsed time must be measured between receipt of only that component which is reflected by the leading vehicle. This requires two threshold detectors to be employed to start charging after receiving the first component pulse reflected from the windshield of the following car, and to stop charging upon receipt of the second component pulse reflected by the leading vehicle, respectively.

As has been mentioned above, one of the major sources of error in hitherto proposed anti-collision systems is the occurrence of false alarms. False alarms are typically caused by the rangefinder emitting a beam which is reflected not by an adjacent vehicle but, instead, by some extraneous object such as, for example, a lamp post, a tree or even another vehicle which does not represent a danger to the following vehicle. Use of a laser rangefinder goes a long way to eliminating extraneous reflections by false objects since the dispersion angle of the laser beam is very small. However, there still exists the possible cause of error that, when turning a corner, the laser beam is directed to a vehicle in an adjacent lane rather than in the same lane as the following vehicle.

Figure 7A:
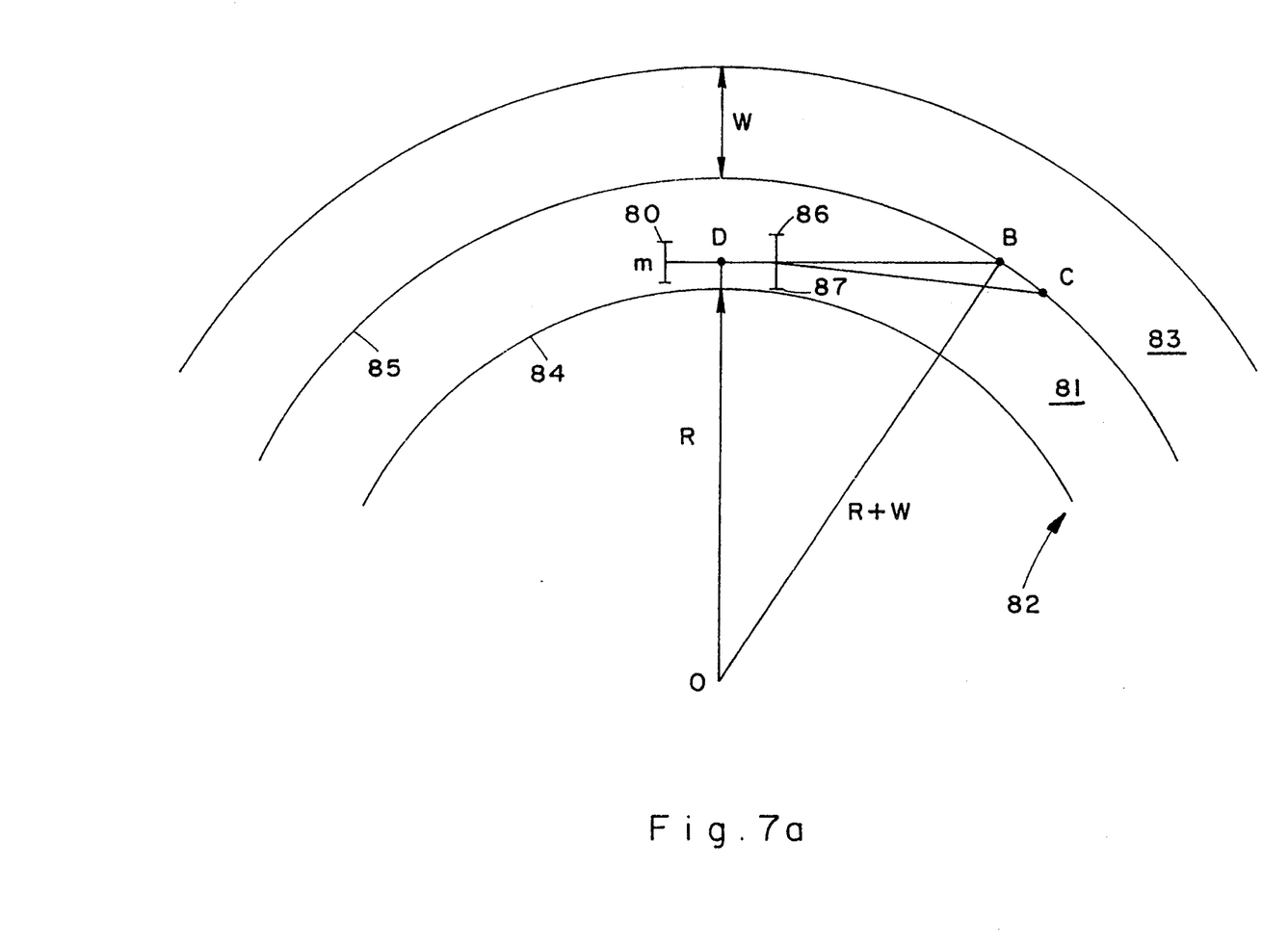
FIGS. 7a, 7b and 7c are geometric diagrams showing how the system according to the invention discriminates between vehicles in different lanes.

FIG. 7a shows geometrically a vehicle 80 travelling along an inner lane 81 of a two lane highway depicted generally as 82 and having an outside lane 83, the outer wheels of the vehicle 80 lying on an inside edge 84 of the inner lane 81. The inner and outer lanes 81 and 83 meet at a common boundary 85 and have identical widths W.

In the following analysis it is assumed that the vehicle 80 is turning a circular curve of radius R and center O. Thus, assuming:

α is the dispersion angle of the laser beam
B is the point of intersection by a central portion of the laser beam with the adjacent lane 83
A is the point of intersection by the nearest part of the laser beam with adjacent lane 83
C is the point of intersection of the far portion of the laser beam with the adjacent lane 83
W is the width of each lane
m is the width of the vehicle 80
R is the turning radius, and
DC is the maximum distance travelled by the laser beam when reflected by a vehicle in the same lane 81 as the vehicle 80, then, considering ΔDBO it can be shown that:

$$DB = \sqrt{(R + W)^2 - \left(R + \frac{m}{2}\right)^2}$$

$$BB' = DB \tan \frac{\alpha}{2}$$

Figure 7B:
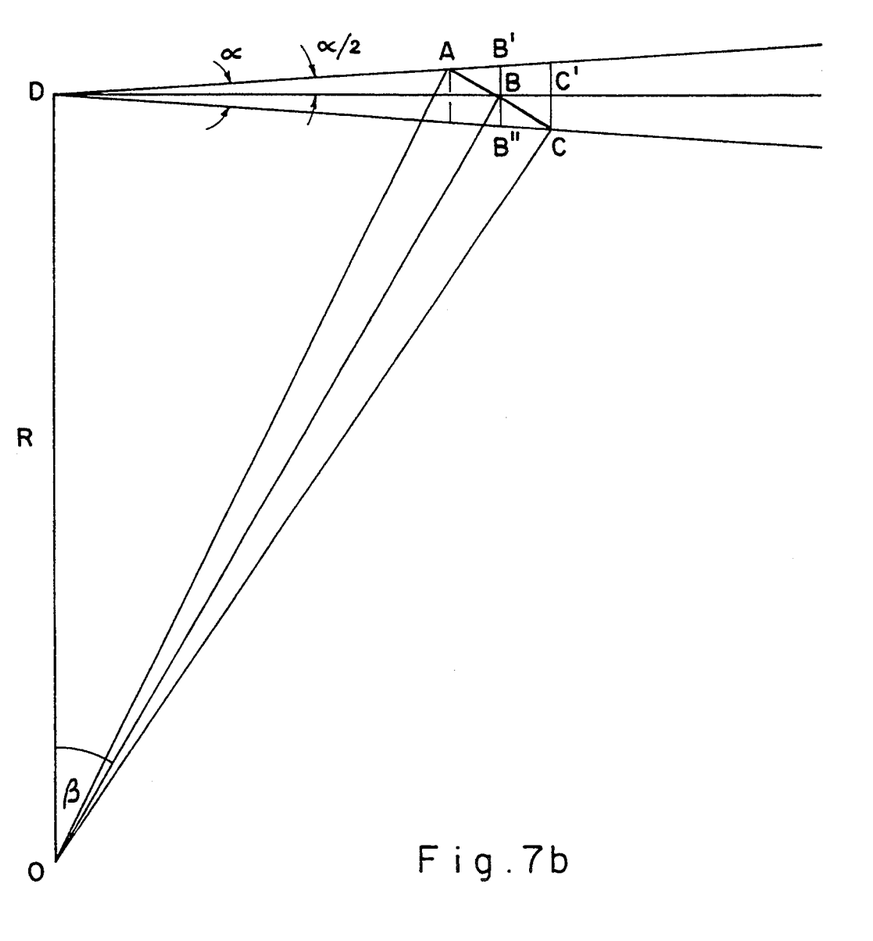

Referring to FIG. 7b, in ΔODC, sides OD and OC are known as is angle ODC. Hence side DC may be calculated using the cosine rule. as follows:

$$OC^2 = OD^2 + CD^2 - 2OD \cdot CD \cos\left(90 - \frac{\alpha}{2}\right)$$

$$(R + W)^2 = R^2 + CD^2 - 2R \cdot CD \sin \frac{\alpha}{2}$$

giving a quadratic equation which can be solved for CD.

Thus, there exists a maximum distance propagated by the laser beam whilst still striking a vehicle in the same lane and which varies in accordance with the dispersion angle α of the laser beam, the width W of the lane, the width m of the vehicle and the radius R of the turning circle.

In practice, the dispersion angle α of the laser beam, the width W of the lane and the width m of the vehicle are all constant for a particular device since road lanes are generally of constant, known width. The values of α may easily be measured and stored within a memory (not shown) associated with the micro-controller 13 (FIG. 1), during manufacture of the device, whilst the values of W and m may likewise be stored upon installing the device in a vehicle for the first time.

The maximum distance DC is thus a function of several stored parameters and the turning radius R and constitutes a threshold, which if exceeded by a measured propagation distance, must be rejected.

Figure 7C:
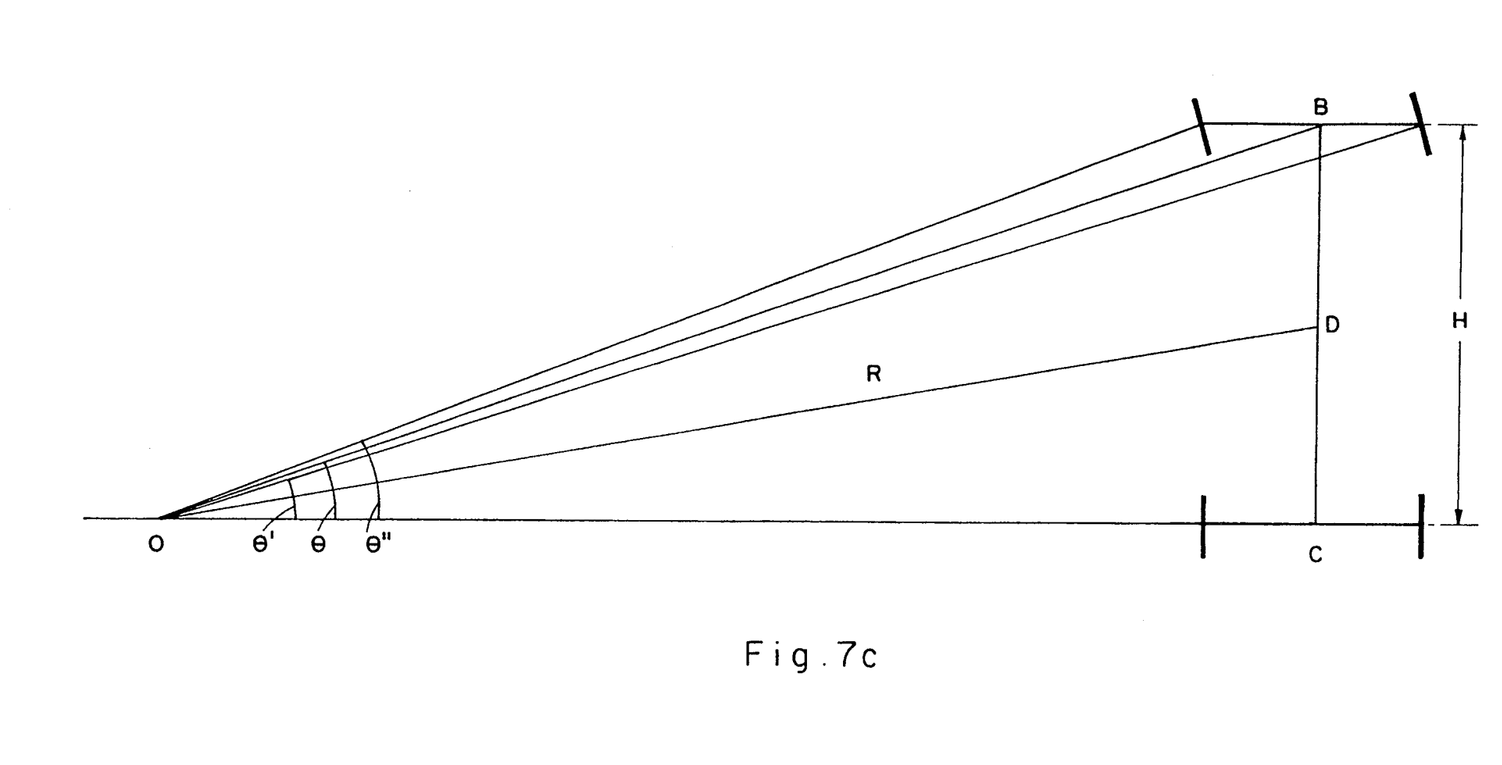

FIG. 7c shows that the turning radius R is itself a function of the wheel base between the front and rear axles of the vehicle and the average turning angle of the front wheels which may be determined by measuring an offset angle of the steering mechanism relative to a base value when the vehicle is moving straight. Thus assuming:

H is the wheel base of the vehicle, and $\theta$ is the average turning angle of the front wheels, then it may be shown that:

$$R = H\sqrt{\frac{4 + \tan^2\theta}{4\tan^2\theta}}$$

It will be appreciated that the above analysis is simplified and that if the vehicle 80 is closer to the boundary 85 between the inner lane 81 and the outer lane 83, the beam will travel a correspondingly shorter distance than DC prior to striking a vehicle in the outer lane 83. Thus, some false alarms may still occur, albeit many fewer than would otherwise be produced. However, more importantly, the distance propagated by the beam before being reflected by another vehicle in the inner lane 81 (i.e. the same lane) will always be smaller than the stored threshold DC and will therefore not be rejected.

Figure 8:
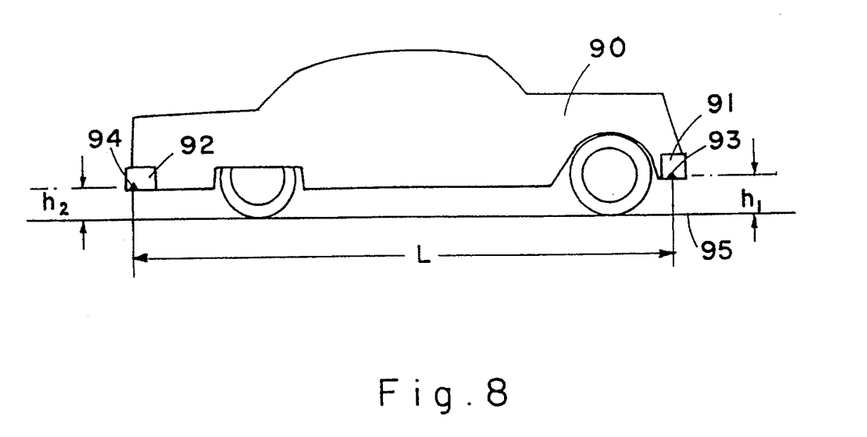
FIG. 8 is a pictorial representation of a vehicle having height transducers in accordance with a further embodiment of the invention.

FIG. 8 shows pictorially a vehicle 90 having a front fender 91 and a rear fender 92. Positioned on the front and rear fenders 91 and 92 are respective transducers 93 and 94 which are at heights $h_1$ and $h_2$, respectively, above a road surface 95.

Figure 9:
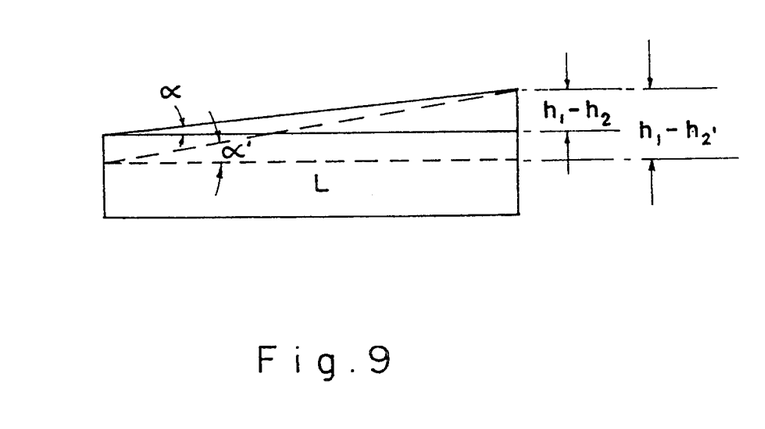
FIG. 9 is a geometric representation useful for explaining operation of the embodiment shown in FIG. 8.

FIG. 9 relates to the situation shown in FIG. 8, and represents geometrically the effect of varying a load distribution within the vehicle 90 such that the heights $h_1$ and $h_2$ vary accordingly.

In the initial situation depicted in FIG. 8, there exists an angle $\alpha$ between the road surface 95 and an imaginary line joining the two transducers 93 and 94, given by:

$$\tan\alpha = \frac{(h_1 - h_2)}{L}$$

Consequent to an increased loading towards a rear end of the vehicle 90, the value of $h_2$ decreases giving rise to a new value $\alpha'$ between the road surface 95 and the imaginary line joining the two transducers 93 and 94.

The variation in the angle a is computed in response to the height measurements provided by the transducers 93 and 94 and is fed to a servo system (not shown) connected to the rangefinder 14, so that the angle of the laser beam emitted by the rangefinder 14 may be varied in order to compensate for variations in the angle $\alpha$.

It will be appreciated that modifications may be made to the device without departing from the spirit of the invention. For example, although in the embodiment described with reference to FIG. 1 of the drawings, the power supply is provided as a separate unit, it may equally well be incorporated within the device itself.

Similarly other modifications will be apparent to those skilled in the art.

What is claimed is:

1. A vehicle anti-collision device comprising:

a rangefinder for mounting inside a following vehicle near to a windshield thereof for measuring a distance of said vehicle from a leading vehicle, distance sampling means coupled to the rangefinder for sampling measured distances at predetermined time intervals, self-speed determination means for measuring a self-speed of the following vehicle, safety time determination means coupled to the distance sampling means and to the self-speed determination means and responsive to the measured self-speed of the following vehicle for determining a safety time between the following and leading vehicles;

comparing means coupled to the safety time determination means for comparing said safety time with a predetermined threshold, and alarm means coupled to the comparing means for generating an alarm if the safety time is less than said predetermined threshold, wherein the rangefinder is coupled to a steering mechanism of the following vehicle and includes:

a laser light source for emitting a beam of laser light, a first component of which is reflected by the windshield, a second component of which passes through the windshield of the following vehicle so as to be reflected by the leading vehicle, detector means for receiving said first and second components and generating respective first and second detector signals, timing means coupled to the detector means and responsive to the first and second detector signals for measuring an elapsed time between the detection of the first and second components, distance determination means coupled to the timing means and responsive to said measured elapsed time for determining the distance between the following and leading vehicles, turning angle determination means coupled to the steering mechanism for determining a turning radius thereof, lane differentiation means coupled to the turning angle determination means and responsive to said turning radius, to a known dispersion of said laser beam, to a known lane width and to a known vehicle width for determining a maximum distance between the following vehicle and the leading vehicle for which the two vehicles are in identical lanes, and switching means coupled to the lane differentiation means, to the turning angle determination means and to the detector means for intercepting the reflected first component of the laser beam and directing it to the detector means only if the two vehicles are in identical lanes.

2. The device according to claim 1, further including leading speed determination means for determining a speed of the leading vehicle.

3. The device according to claim 2, wherein the leading speed determination means includes:

closing speed determination means coupled to the distance sampling means and responsive to a difference in successive sampled distances and said predetermined time interval for determining a closing speed of the following vehicle with respect to the leading vehicle, and difference means for subtracting said closing speed from the self-speed of the following vehicle.

4. The device according to claim 2, further including a display for displaying the speed of the leading vehicle.

5. The device according to claim 1, further including a display for displaying the safety time.

6. The device according to claim 1, wherein the self-speed determination means is coupled to a speedometer of the following vehicle.

7. The device according to claim 1, wherein the self-speed determination means includes:
   at least one light-reflective strip on a drive shaft of the following vehicle,
   a source of light directed towards the drive shaft so as to strike the light-reflective strip during each revolution of the drive shaft,
   a detector for receiving a reflected beam of light reflected by the light-reflective strip and generating a detector signal,
   a clock,
   a counter coupled to the clock and to the detector for counting a number of detector signals in a predetermined time interval so as to determine a number of revolutions of the drive shaft in said time interval thereby permitting the self speed of the following vehicle to be calculated.

8. The device according to claim 1, wherein the turning angle determination means is responsive to a known wheel base of the vehicle and to an offset angle of the steering mechanism relative to a predetermined angle corresponding to a straight trajectory of the vehicle.

9. The device according to claim 1, further including safety time adjustment means for adjusting said predetermined threshold.

10. The device according to claim 1, wherein the rangefinder includes a sensitivity selection means for adjusting a sensitivity thereof.

11. A vehicle anti-collision device comprising:
   a rangefinder for mounting inside a following vehicle near to a windshield thereof and being coupled to a steering mechanism thereof for measuring a distance of said vehicle from a leading vehicle,
   distance sampling means coupled to the rangefinder for sampling measured distances at predetermined time intervals,
   self-speed determination means for measuring a self-speed of the following vehicle,
   safety time determination means coupled to the distance sampling means and to the self-speed determination means and responsive to the measured self-speed of the following vehicle for determining a safety time between the following and leading vehicles,
   comparing means coupled to the safety time determination means for comparing said safety time with a predetermined threshold, and
   alarm means coupled to the comparing means for generating an alarm if the safety time is less than said predetermined threshold;
   the rangefinder including:
      a laser light source for emitting a beam of laser light a first component of which is reflected by the windshield, a second component of which passes through the windshield of the following vehicle so as to be reflected by the leading vehicle,
      detector means for receiving said first and second components and generating respective first and second detector signals,
      timing means coupled to the detector means and responsive to the first and second detector signals for measuring an elapsed time between the detection of the first and second components, and
      distance determination means coupled to the timing means and responsive to said measured elapsed time for determining the distance between the following and leading vehicles,
   and said device further including:
      turning angle determination means coupled to the steering mechanism for determining a turning radius thereof,
      lane differentiation means coupled to the turning angle determination means and responsive to said turning radius, to a known dispersion of said laser beam, to a known lane width and to a known vehicle width for determining a maximum distance between the following vehicle and the leading vehicle for which the two vehicles are in identical lanes, and
      switching means coupled to the lane differentiation means, to the turning angle determination means and to the detector means for intercepting the reflected first component of the laser beam and directing it to the detector means only if the two vehicles are in identical lanes, and
      an elevation adjustment means coupled to the laser light source for adjusting an elevation angle of the laser beam such that the elevation angle is substantially constant regardless of load distribution within the following vehicle.

12. A vehicle anti-collision device comprising:
   a rangefinder for mounting inside a following vehicle near to a windshield thereof for measuring a distance of said vehicle from a leading vehicle,
   distance sampling means coupled to the rangefinder for sampling measured distances at predetermined time intervals,
   self-speed determination means for measuring a self-speed of the following vehicle,
   safety time determination means coupled to the distance sampling means and to the self-speed determination means and responsive to the measured self-speed of the following vehicle for determining a safety time between the following and leading vehicles;
   comparing means coupled to the safety time determination means for comparing said safety time with a predetermined threshold, and
   alarm means coupled to the comparing means for generating an alarm if the safety time is less than said predetermined threshold;
   wherein the rangefinder includes:
      a laser light source for emitting a beam of laser light a first component of which is reflected by the windshield, a second component of which passes through the windshield of the following vehicle so as to be reflected by the leading vehicle,
      detector means for receiving said first and second components and generating respective first and second detector signals, timing means coupled to the detector means and responsive to the first and second detector signals for measuring an elapsed time between the detection of the first and second components, and distance determination means coupled to the timing means and responsive to said measured elapsed time for determining the distance between the following and leading vehicles; and wherein a laser frequency of the laser light source is randomly selected between predetermined lower and upper thresholds in respect of a specific vehicle, and said device further provided filtering means for filtering out a received signal whose frequency differs from said laser frequency, thereby preventing false alarms owing to receipt of spurious signals in a region of said specific vehicle.

13. A vehicle anti-collision device comprising:

a rangefinder for mounting inside a following vehicle near to a windshield thereof for measuring a distance of said vehicle from a leading vehicle, distance sampling means coupled to the rangefinder for sampling measured distances at predetermined time intervals, self-speed determination means for measuring a self-speed of the following vehicle, safety time determination means coupled to the distance sampling means and to the self-speed determination means and responsive to the measured self-speed of the following vehicle for determining a safety time between the following and leading vehicles;

comparing means coupled to the safety time determination means for comparing said safety time with a predetermined threshold, and alarm means coupled to the comparing means for generating an alarm if the safety time is less than said predetermined threshold; the rangefinder including:

a laser light source for emitting a beam of laser light a first component of which is reflected by the windshield, a second component of which passes through the windshield of the following vehicle so as to be reflected by the leading vehicle, detector means for receiving said first and second components and generating respective first and second detector signals, timing means coupled to the detector means and responsive to the first and second detector signals for measuring an elapsed time between the detection of the first and second components, and distance determination means coupled to the timing means and responsive to said measured elapsed time for determining the distance between the following and leading vehicles;

and further including an elevation adjustment means coupled to the laser light source for adjusting an elevation angle of the laser beam such that the elevation angle is substantially constant regardless of load distribution within the following vehicle.

* * * * *